(12) United States Patent
Sangiacomo

(10) Patent No.: US 6,968,714 B2
(45) Date of Patent: Nov. 29, 2005

(54) KNITTED UNDERPANTS WITH FRONT-SIDE OPENINGS AND WITHOUT SEAMS IN THE CRUTCH AND METHOD TO MANUFACTURE

(75) Inventor: Fulvio Sangiacomo, Brescia (IT)

(73) Assignee: Sangiacomo S.p.A., Brescia (IT)

(*) Notice: Subject to any disclaimer, the term of this patent is extended or adjusted under 35 U.S.C. 154(b) by 0 days.

(21) Appl. No.: 11/060,616

(22) Filed: Feb. 17, 2005

(65) Prior Publication Data

US 2005/0193777 A1    Sep. 8, 2005

(30) Foreign Application Priority Data

Mar. 2, 2004    (IT) .......................... BS2004A0028

(51) Int. Cl.$^7$ ................................. D04B 1/24
(52) U.S. Cl. .......................................... 66/177; 2/402
(58) Field of Search ................. 66/175–177, 170, 66/169 R, 171; 2/400, 402–409

(56) References Cited

U.S. PATENT DOCUMENTS

| 4,326,302 | A | * | 4/1982 | Lowe et al. ................. 2/405 |
| 4,682,479 | A | * | 7/1987 | Pernick ...................... 66/176 |
| 5,163,306 | A | * | 11/1992 | Boehm et al. ............... 66/177 |
| 5,535,452 | A | * | 7/1996 | Rozenblat ................... 2/403 |
| 5,572,888 | A | * | 11/1996 | Browder et al. ............. 66/171 |
| 5,605,060 | A | * | 2/1997 | Osborne ...................... 66/171 |
| 6,192,717 | B1 | * | 2/2001 | Rabinowicz ................ 66/177 |

* cited by examiner

*Primary Examiner*—Danny Worrell
(74) *Attorney, Agent, or Firm*—McGlew and Tuttle, P.C.

(57) ABSTRACT

The invention concerns a knitted-fabric garment in the shape of underpants, in which the crutch area is made up by a knitted-fabric prolongation without interruption with the rear part and folded up in order to be placed upon the front part of the garment body, forming there a front central panel. This front panel is fixed only at the outer points of a free end of the front part and at level with the waist-encircling edge, defining with the front part two side symmetrical openings, both communicating with a horizontal opening that comes out between the panel itself and the front-part free end. The invention concerns also a manufacturing method of the said garment.

7 Claims, 2 Drawing Sheets

KNITTED UNDERPANTS WITH FRONT-SIDE OPENINGS AND WITHOUT SEAMS IN THE CRUTCH AND METHOD TO MANUFACTURE

1. Field of the Invention

The present invention concerns the field of both circular and flat knitting machines, and it refers in particular to a method for manufacturing and shaping men's underpants on the said machines, as well as to a garment obtained through said method.

2. State of the Technique

Various methods are already known for the carrying out panties made in knitted fabric. Till now, they have been generally manufactured mainly by starting from a tubular knitted-fabric element, cutting the said tubular element suitably in order to shape a blank of the garment, executing one or more finishing seams in some of its parts and by putting in, where required, some elastics level with the waist-measure and the openings for the legs.

It is, however, evident that the underpants carried out like this, imply knitted-fabric discard, corresponding waste of yarn, taking again the intermediate blank for sewing and finishing operations, therefore a remarkable manpower employment, considerable time and cost of execution.

OBJECTS OF THE INVENTION

It is, however, an object of the present invention to propose a new and original method for manufacturing a garment in the shape of men's underpants, starting from a substantially tubular, knitted-fabric blank manufactured and shaped by a knitting machine, and then finished out of the knitting machine with an advantageous saving of material and manufacturing time.

Another object of the invention is the carrying out of a knitted garment in the shape of men's underpants, coming out with two front openings on the opposite sides of a front central portion and, advantageously, with no seam in the area of the infra-leg crutch area.

Said objects are achieved with a garment in the shape of underpants according to claim 1 and through a manufacturing method according to claim 2 or 3.

BRIEF DESCRIPTION OF THE DRAWINGS

The invention will be hereafter described more in detail with reference to the enclosed indicative and not limitative schematic drawings, in which.

INVENTION DETAILED DESCRIPTION

Figure 4:
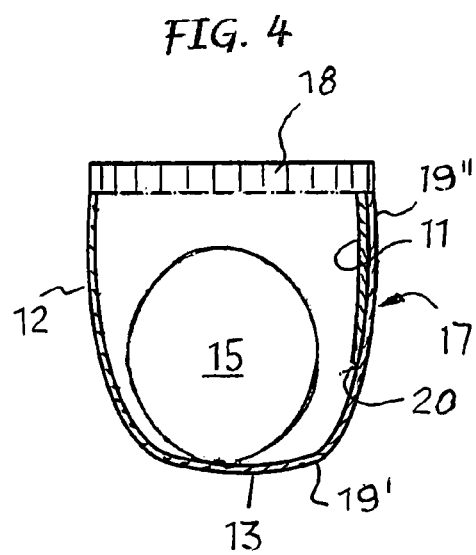
FIG. 4 shows a section of the underpants in FIG. 3.

A garment in the shape of underpants, as represented in FIG. 4, comprises a body portion that has a front part 11 and a rear part 12 that join an infra-leg crutch area 13 and that are shaped in order to define an opening of a waist-encircling portion 14, two openings 15 for legs, and two front openings 16 on opposite sides of a central panel 17.

Figure 1:
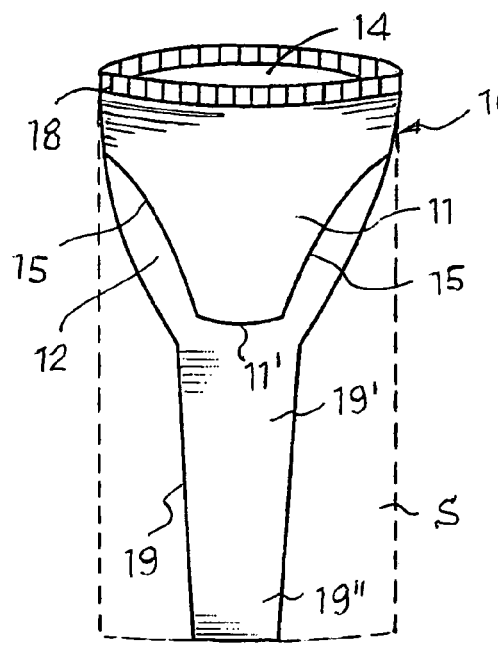
FIGS. 1 and 2 show a front and side views of a knitted-fabric blank element to carry out underpants according to the invention.
Figure 2:
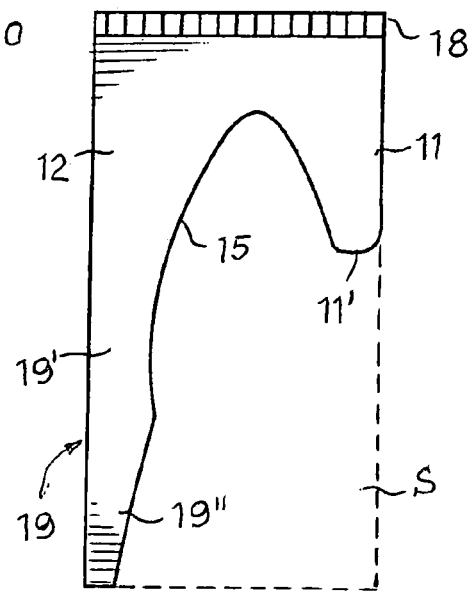

In one first preferred embodiment, the here considered garment can be carried out by starting from a single knitted-fabric blank 10 manufactured in a tubular shape and cut as shown in FIGS. 1 and 2. The manufacturing of the said single knitted-fabric tubular blank 10 can be executed in any knitted-fabric kind and using the needles, for instance, on the cylinder of a multi-feed circular knitting machine, which is known and, as such, does not require a detailed description. Only, it will have to be programmed to execute a preordained sequence of knitting steps.

More precisely, the tubular knitted-fabric blank 10 can be manufactured in a predetermined length, starting from a preferably elastic edge 18, that defines the opening of the waist-encircling portion 14. During its manufacturing, said tubular blank 10 is fitted out with traces in knitted-fabric and/or in different yarns, which define the front 11 and the rear part 12 of the garment body portion, and which are shaped at the sides through an opportune selection of the operating needles at level with the opening 15 for legs, and continuing only in the rear part 12, a knitted-fabric extension 19, while the front part 11 is completed and, in case, cut at its end 11'. The extension 19 is shaped at the sides and has a predetermined length so that one first part 19' of the said extension makes up the crutch area 13 between the legs and a remaining part 19" can make up the garment front central panel 17.

It has to be noted that it will be possible to carry out the extension 19, at least its first part 19' designed to make up the crutch area 13, with a yarn feed (for instance antiallergic, bacteriostatic ones) and/or in a knitted-fabric type (for instance "bag" type) that are different from the ones used in the manufacturing of the knitted fabric of the other tubular blank 10, depending from requirements.

The tubular blank so manufactured is unloaded from the textile machine, then cut along the traces represented by solid lines in FIGS. 1 and 2 in order to remove the superfluous parts S, leaving only the elastic edge 18, the front and rear parts 11, 12 and the extension 19.

Figure 3:
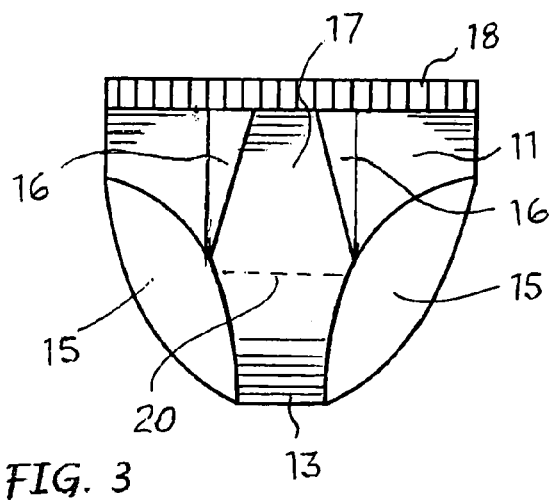
FIG. 3 shows a front view of the finished underpants.

The garment in the shape of underpants is then assembled and finished out of the knitting machine simply by folding up the shaped extension 19 on the front side of the front part 11 and fixing said extension only at the outer points of the end 11' of the said front part 11 and at level with the waist-encircling portion 18 as show in FIGS. 3 and 4. So, the first part 19' of the shaped extension 19 will in fact make up the garment crutch area 13. On the other hand, the remaining part 19" of the said extension 19 will make up the central panel 17 in the front area of the garment body portion, defining with the front part 11, which it is placed upon, the two desired side symmetrical openings 16, both communicating with a horizontal opening 20 that comes out between the said panel and the free end 11' of the said front part 11.

Figure 5:
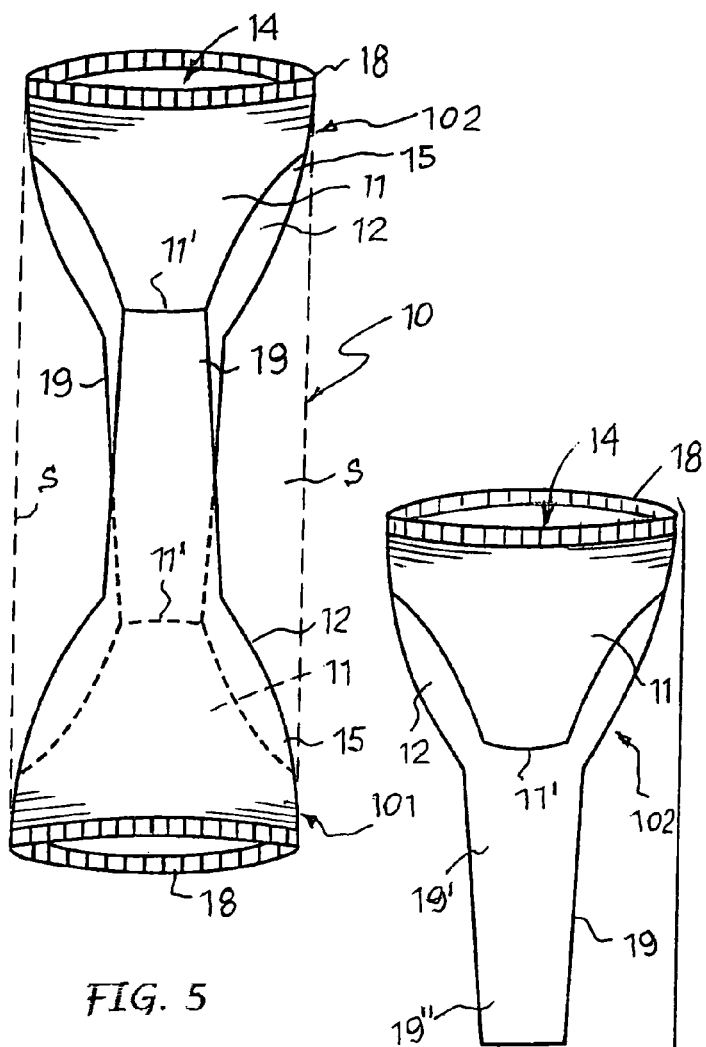
FIG. 5 shows a tubular fabric blank intended for the simultaneous carrying out of a couple of underpants according to the invention.
Figure 6:
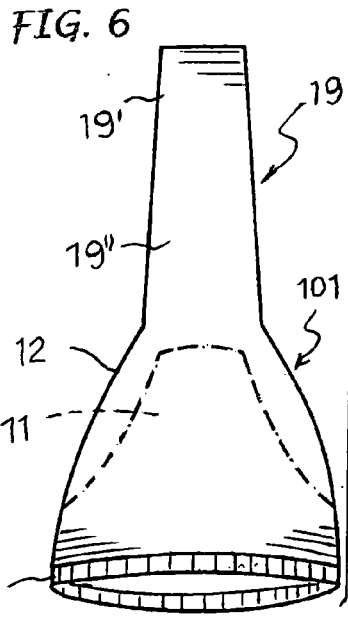
FIGS. 6 and 7 show the front and side views of two knitted elements cut out from the tubular element in FIG. 5 and separated for the carrying out of two single underpants as in FIG. 3.
Figure 7:
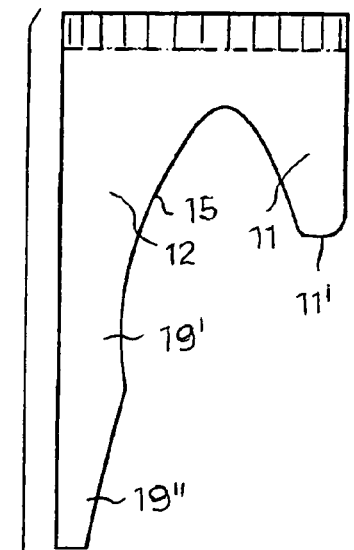
Figure 7:
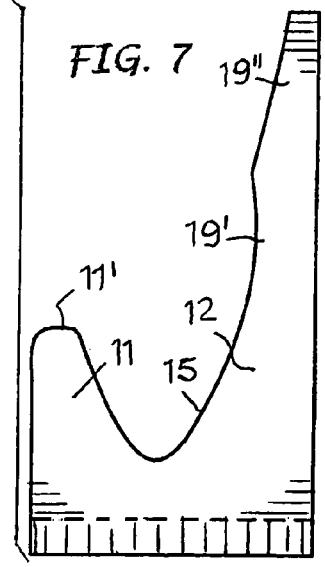

In accordance with another way to carry out the invention and as shown in FIGS. 5–7, the underpants may be manufactured two by two, starting from two relevant blanks 101, 102 cut out from a single knitted-fabric tubular element 100 that contains them and in which they are delimited by cutting traces. Said two blanks are like each other and like the single blank 10 above described, but in overturned positions and rotated 180° one towards the other. The portions of said blanks 101, 102 that are like or equivalent to those of the single blank 10 are indicated with the same numerical reference.

The starting tubular element 100 comprising the two joined blanks 101, 102 are knitted starting from the waist-encircling edge 18 of a first blank 101 and ending to the waist-encircling edge of the second blank 102 as shown in FIG. 5. More minutely, a first preferably elastic edge 18, the shaped front 11 and rear part 12 of a first blank 100, two shaped extensions 19 continuing the front part 11 and the rear part 12 respectively of said first blank and, then, the front part 11 and the rear part 12 of the second blank 101, following the extension continuing the rear part 12 and following the extension continuing the front part 11 respectively, and finally a second edge 18 like the first one, are manufactured in succession, within the tubular knitted-fabric element.

Then, the tubular element is cut to remove the superfluous parts S-broken lines in FIG. 5-, and the two blanks 101, 102 are separated by cutting the fabric at level with the end 11' of front parts 11 of both blanks so as to leave the extensions 19 continuing the rear parts 12 of both blanks as shown in FIGS. 6 and 7.

Such a separation of the two blanks 101, 102 can be executed through appropriate means also during the knitted-fabric manufacturing on the textile machine.

Once separated, each of the two raw elements is assembled in the same way and with the same results described regarding the finishing of the garment obtained with a single starting knitted blank.

What is claimed is:

1. A garment in the shape of underpants with a body portion having a front and rear parts that join an infra-leg crutch area and that define a waist-encircling portion and two openings for legs, characterized in that the crutch area is made up by a knitted-fabric extension without interruption with garment rear part and folded up frontally in order to be placed upon said garment front part forming there a front central panel, and in that said front panel is fixed only at outer points of a free end of said front part and at level with the waist-encircling portion, defining with said front part two side symmetrical openings, both communicating with a horizontal opening that comes out between said panel and the free end of said front part.

2. A method for knitting on a knitting machine a garment in the shape of underpants with a body portion having a front and rear parts that join a crutch area and that define a waist-encircling portion, two openings for legs and two front openings on the opposite sides of a central panel, comprising the steps of:
    manufacturing a tubular knitted-fabric element with traces defining a blank element, having in succession
    an edge defining the waist-encircling portion,
    front and rear parts manufactured simultaneously and shaped to define the openings for legs,
    a shaped extension continuing the rear part, while the front part is interrupted at one of its ends;
    unloading the tubular knitted-fabric element from the machine, cutting the blank element following the preformed traces, and
    folding up the shaped extension on a front side of the front part, fixing it only at the outer points of the free end of said front part and at level with the waist-encircling edge, so that one first part of said shaped extension makes up the crutch area and the remaining part of the said prolongation makes up the central panel in the front part of the body portion, to define with said front part two side symmetrical openings, both communicating with a horizontal opening between said panel and the free end of said front part.

3. A method for knitting on a knitting machine a garment in the shape of underpants with a body portion having a front and rear parts that join a crutch area and that define a waist-encircling portion, two openings for legs and two front openings on the opposite sides of a central panel, comprising the steps of:
    manufacturing a tubular knitted-fabric element with traces defining two joined blank elements for the forming of a couple of underpants, and including:
    a first edge defining a first waist-encircling portion,
    a first front part and a first rear part manufactured and shaped to define two first openings for legs,
    two shaped extensions continuing said first front and rear parts respectively,
    a second front part and a second rear part that follow the extensions continuing the extension continuing the first rear part and the extension continuing the first front part, respectively,
    a second edge defining a second waist-encircling portion; unloading, the tubular knitted-fabric element from the machine; cutting the two blank elements following the preformed traces; and
    separating the two blank elements by cutting the knitted fabric at the front part ends of both blank elements, leaving said extensions in continuation with rear parts of both blank elements;
    picking up every blank element to fold up the shaped extension on a front side of its front part, fixing it only at the outer points of the free end of said front part and at level with the edge of the respective waist-encircling portion, and so that one first part of said shaped extension makes up the crutch area and the remaining part of said extension makes up the central panel in the garment body portion, defining with said front part two side symmetrical openings, both communicating with a horizontal opening between said cloth and the free end of said front part.

4. Method in accordance with claim 3, in which the two blank elements are cut and separated during their knitting.

5. Method in accordance with claim 3, in which two blank elements are cut and separated after the completion of the knitting of the tubular blank element.

6. Method in accordance with claim 2, in which at least the first part of the extension designed for making up the crutch area is manufactured with yarns and/or in a knitted-fabric type that are different from the ones used for the manufacturing of the remaining parts of every knitted-fabric raw element.

7. Method in accordance with claim 3, in which at least the first part of the extension designed for making up the crutch area is manufactured with yarns and/or in a knitted-fabric type that are different from the ones used for the manufacturing of the remaining parts of every knitted-fabric raw element.

* * * * *